United States Patent Office 3,786,069
Patented Jan. 15, 1974

3,786,069
ISOMERIZATION OF LACTONES TO GIVE ALKYLBUTYROLACTONES
Paul Aviron-Violet and Yves Colleuille, Lyon, France, assignors to Rhone-Poulenc S.A., Paris, France
No Drawing. Filed May 4, 1971, Ser. No. 140,264
Claims priority, application France, May 6, 1970, 7016613
Int. Cl. C07d 5/06
U.S. Cl. 260—343.6                                              6 Claims

ABSTRACT OF THE DISCLOSURE 5-alkyl-γ-butyrolactones are obtained by isomerizing a lactone of formula

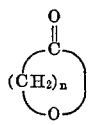

where n=4, 5, 6 or 7 in the presence of a solid acidic catalyst. Vapor of the starting lactone is contacted with the solid catalyst which exhibits either Bronsted or Lewis acidity e.g. boron phosphate or phosphoric acid.

---

The present invention relates to a process for producing 5-alkyl-γ-butyrolactones from higher lactones containing at least 6 ring atoms.

5-alkyl-γ-butyrolactones are known from the literature. Thus, U.S. patent specification No. 2,786,852 describes the production of 5-methyl-γ-butyrolactone, by hydrogenation of laevulinic acid. The lactone has been used as a solvent for lacquers and varnishes and as a starting material for insecticides, but the starting material used in the process is difficult to obtain.

The present invention provides a process for the preparation of a 5-alkyl-γ-butyrolactone of formula

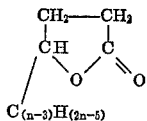

in which n is 4, 5, 6 or 7, wherein vapor of a lactone reactant of general formula

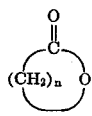

is brought into contact with a solid catalyst giving an acid reaction.

In the above formulae, n is preferably equal to 4 or 5. The lactones which can be isomerized according to the process can be obtained by any known process, either by cyclization of the corresponding ω-hydroxyacids or by oxidation of the corresponding ketones.

The catalysts which allow this isomerization reaction to be carried out are solid catalysts of acid character, the acidity of which is to be understood either in the Bronsted sense or in the Lewis sense. The catalysts are used for heterogeneous catalysts in the vapor phase. These catalysts are all compounds deficient in electrons as defined in "Catalytic Conversion of Hydrocarbon" by J. E. Germain, published by Academic Press, London, and "Friedel-Craft and Related Reactions" by Olah, vol. I, pp. 201–204. Suitable solid acid catalysts include acid halides such as $AlCl_3$, $AlBr_3$, $BeCl_2$, $SnCl_4$ and $FeCl_3$, metal oxides or metalloid oxides, by themselves or in combination, such as $Al_2O_3$, $MgO$, $SiO_2$ and $B_2O_3$, inorganic salts of strong acids such as boron phosphate, and strong mineral acids deposited on carriers of neutral or acid character such as phosphoric acid deposited on silica or on kieselguhr, and boric acid deposited on silica. It is also possible to use natural aluminium silicates which may or may not have been subjected to an activation treatment, such as kaolinite, montmorillonite or attapulgite.

The process is advantageously carried out continuously, the lactone being injected into the reactor in the liquid state or in solution in an inert solvent which is so chosen that it is completely vaporized under the reaction conditions. Benzene or toluene are suitable solvents for this purpose. It is also possible to provide a stream of inert gas e.g. nitrogen, through the reactor to facilitate the removal of the reaction products. The 5-alkylbutyrolactone produced can be isolated from its solution in benzene or other solvent by any known means, e.g. distillation under reduced pressure.

The examples which follow illustrate the invention.

EXAMPLE 1

100 cm.³ of a boron phosphate catalyst prepared as described in United Kingdom patent specification No. 1,033,957 are placed in a vertical tubular reactor (length: 800 mm.; interior diameter: 3.5 mm.). The reactor is heated to 250° C., and a benzene solution of δ-valerolactone (weight ratio lactone:benzene=1:1) is injected at the rate of 30 cm.³/hour, while nitrogen is passed through the reactor at 10 l./hour measured at normal temperature and pressure. After 1 hour's continuous running, a 28.1 g. fraction is obtained, containing as determined by chromatographic analysis 39.7% of γ-valerolactone (5-methylbutyrolactone) and 14.4% of unconverted δ-valerolactone. The pure methylbutyrolactone is recovered by rectification.

EXAMPLE 2

80 cm.³/hour of a benzene solution of ε-caprolactone (weight ratio of lactone/benzene=1:1) are injected into the reactor described in Example 1, charged with the catalyst described in Example 1 and heated to 250° C. After 1 hour's running, 71 g. of a benzene solution are recovered containing 13% 5-ethyl-γ-butyrolactone and 31% ε-caprolactone as indicated by chromatographic analysis.

EXAMPLE 3

1.58 g. of a catalyst obtained by calcining a kieselguhr impregnated with phosphoric acid (average $P_2O_5$ content 60% of $H_3PO_4$) prepared as described in U.S. patent specification No. 2,120,702, are placed in a vertical tubular reactor of 2 cm.³ capacity. A benzene solution of δ-valerolactone (weight ratio lactone:benzene=1:1) is injected into the reactor at the rate of 0.6 cm.³/hour, whilst passing nitrogen at the rate of 0.2 l./hour, measured at normal temperature and pressure through the reactor maintained at 250° C. After 1 hour, 0.485 g. of a benzene solution are obtained, and chromatography shows that 32.4% of 5-methyl-butyrolactone have formed and that 20% of unconverted δ-valerolactone are present.

EXAMPLE 4

1.83 g. of a catalyst identical to that described in Example 1 are placed in the reactor described in Example 3. The reactor is heated to 250° C. and a benzene solution of ε-caprolactone (weight ratio lactone-benzene= 1:1) is introduced at the rate of 1.2 cm.³/hour, whilst passing nitrogen through at the rate of 0.2 l./hour measured at normal temperature and pressure. After 1 hour, 0.674 g. of a benzene solution are obtained, and chromatography shows that 27% 5-ethyl-γ-butyrolactone have formed. No ε-caprolactone is left.

We claim:
1. A process for the preparation of a 5-alkyl-γ-butyrolactone of the formula

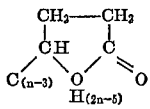

wherein $n$ is 4, 5, 6 or 7 which comprises
bringing the vapor of a lactone reactant of the general formula

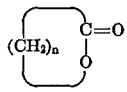

into contact with a solid catalyst which is either a Bronsted acid or a Lewis acid selected from the group consisting of an acidic metal halide, metal or metalloid oxide, an inorganic salt of a strong acid and a strong mineral acid absorbed on a neutral or acid solid carrier.

2. A process according to claim 1 wherein the catalyst is boron phosphate or kieselguhr impregnated with phosphoric acid.

3. A process according to claim 1 wherein $n$ is 4 or 5.

4. A process according to claim 1 wherein the catalyst is maintained at an elevated temperature in a reactor, the lactone reactant is vaporized in the reactor and a stream of inert gas is passed through the reactor to facilitate removal of the reaction products.

5. A process according to claim 1 wherein a solution of δ-valerolactone in benzene is passed into a reactor heated to about 250° C. and containing a catalyst comprising boron phosphate or kieselguhr impregnated with phosphoric acid, nitrogen is passed through the reactor and the vaporized δ-valerolactone is isomerized to give 5-methyl-γ-butyrolactone.

6. A process according to claim 1 wherein a solution of ε-caprolactone in benzene is passed into a reactor heated to about 250° C. and containing a catalyst comprising boron phosphate or kieselguhr impregnated with phosphoric acid, nitrogen is passed through the reactor and the vaporized ε-caprolactone is isomerized to give 5-ethyl-γ-butyrolactone.

References Cited
FOREIGN PATENTS
3,004,989  10/1961  Hasek et al. _____ 260—343.6

ALTON D. ROLLINS, Primary Examiner

A. M. T. TIGHE, Assistant Examiner